United States Patent [19]

Akao

[11] Patent Number: 4,950,512
[45] Date of Patent: Aug. 21, 1990

[54] LAMINATED MATERIAL AND FORMED ARTICLE FOR PACKAGING PHOTOGRAPHIC MATERIALS

[75] Inventor: Mutsuo Akao, Minami-Ashigara, Japan

[73] Assignee: Fuji Photo Film Co., Ltd., Minami-Ashigara, Japan

[21] Appl. No.: 628,444

[22] Filed: Jul. 6, 1984

[30] Foreign Application Priority Data

Jul. 9, 1983 [JP] Japan ................. 58-124103

[51] Int. Cl.$^5$ ................................ B27N 5/32
[52] U.S. Cl. .................. 428/35.8; 428/366.6; 428/156; 428/172; 428/195; 428/212; 428/412; 428/457; 428/461; 428/462; 428/463; 428/474.4; 428/476.3; 428/476.9; 428/480; 428/483; 428/500; 428/516; 428/517; 428/518; 428/520; 428/521; 428/522
[58] Field of Search .............. 428/212, 515, 516, 35, 428/318.4, 318.6, 349, 138, 172, 159, 412, 518, 458, 461, 308.4, 35.9, 36.7, 35.8, 36.6, 156, 195, 457, 462, 463, 474.4, 476.3, 476.9, 480, 483, 500, 517, 520–522; 206/316

[56] References Cited

U.S. PATENT DOCUMENTS

| | | | |
|---|---|---|---|
| 4,105,118 | 8/1978 | Williams, Jr. et al. | 428/516 |
| 4,136,203 | 1/1979 | Murphy et al. | 428/319.9 |
| 4,147,291 | 4/1979 | Akao et al. | 229/3.5 R |
| 4,258,848 | 3/1981 | Akao et al. | 428/516 |
| 4,331,725 | 5/1982 | Akao | 428/138 |
| 4,337,285 | 6/1982 | Akao et al. | 428/461 |
| 4,356,224 | 10/1982 | Akao et al. | 428/220 |
| 4,359,499 | 11/1082 | Akao et al. | 428/515 |
| 4,386,124 | 5/1983 | Akao | 428/483 |
| 4,411,943 | 10/1983 | Akao | 428/513 |
| 4,411,945 | 10/1983 | Akao et al. | 428/520 |
| 4,436,809 | 3/1984 | Akao et al. | 428/207 |
| 4,452,846 | 6/1984 | Akao | 428/515 |
| 4,469,741 | 9/1984 | Akao | 428/516 |
| 4,513,050 | 4/1985 | Akao | 428/458 |
| 4,565,733 | 1/1986 | Akao | 428/515 |
| 4,565,743 | 1/1986 | Akao | 428/513 |
| 4,576,865 | 3/1986 | Akao | 428/516 |
| 4,579,781 | 4/1986 | Akao | 428/513 |
| 4,584,234 | 4/1986 | Hirose et al. | 428/516 |
| 4,587,175 | 5/1986 | Akao | 428/463 |
| 4,629,640 | 12/1986 | Akao | 428/516 |
| 4,639,386 | 1/1987 | Akao | 206/316 |
| 4,653,640 | 3/1987 | Akao | 428/516 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/220 |
| 4,708,896 | 11/1987 | Akao | 428/480 |
| 4,730,778 | 3/1988 | Akao et al. | 206/389 |
| 4,778,712 | 10/1988 | Akao | 428/483 |

*Primary Examiner*—Pamela R. Schwartz
*Attorney, Agent, or Firm*—Burns, Doane, Swecker & Mathis

[57] ABSTRACT

Laminated material sheets for packaging photographic materials, which comprise (a) a middle layer of a thermoplastic resin layer which contains any harmful substances adversely affecting photographic materials, (b) and outer layer having a higher gas-permeability and is photographically inactive comprising a thermoplastic resin and/or a porous flexible sheet layer and (c) an inner layer which is less gas-permeable than said outer layer (b) and is photographically inactive comprising a thermoplastic resin layer, a flexible sheet layer or a laminated layer thereof. Formed articles like containers for like use comprised of said laminated materials. Any harmful substances contained in the thermoplastic resin of the middle layer (a) may diffuse out through the outer layer (b), or they do not almost migrate into the packaged photographic materials through the inner layer (c).

17 Claims, 4 Drawing Sheets

FIG. 14-a
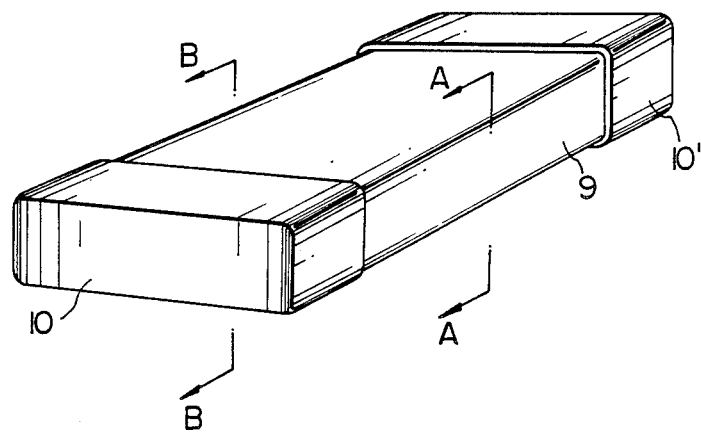
FIG. 14-b
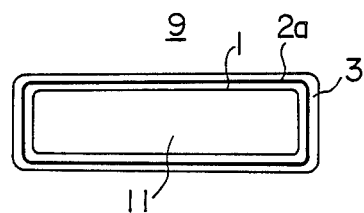

FIG. 15-a
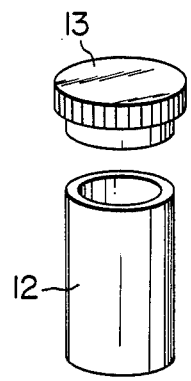
FIG. 15-b
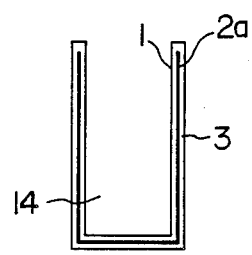

LAMINATED MATERIAL AND FORMED ARTICLE FOR PACKAGING PHOTOGRAPHIC MATERIALS

FIELD OF THE INVENTION

The present invention relates to packaging materials for photographic materials, more precisely to laminated sheets and containers for packaging photographic materials.

BACKGROUND

Photographic materials are not only adversely affected by light but are also deteriorated by moisture, gas, X-ray and electrostatic force as well as by chemical substances having oxidation-reduction activity. In general, since the kind and the amount of additives contained in thermoplastic resins to be used as packaging materials have an influence on the qualities of packaged photographic materials (for example, sensitization or desensitization as well as occurrence of fog and spot), various kinds of conventional commercial polyethylene, polypropylene, polystyrene, ABS, PC, etc. may not be utilized as packaging materials for photographic materials, and therefore some kinds of special resins containing specifically defined additives of a specifically defined amount have heretofore been specifically ordered for said packaging materials. Under the circumstances, imported thermoplastic resins of low price have not heretofore been used for packaging photographic materials, because the additives used therein and the amount thereof are not identified, some factors in the preparation of said resins may possibly be changed, and such confirmation that the resins do not contain any substances harmful to photographic materials cannot be assured. In addition, although it is known that waste materials containing thermoplastic resin scraps are low-priced, these have not heretofore been utilized at all as materials for packaging photographic materials, because the contents of said waste resins are not clear at all, particularly with respect to the adsorbed oils and chemicals and the kind and amount of used additives, said resins contain an extremely large amount of harmful substances compared to conventional packaging materials for photographic materials which are generally used in this technical field, and photographic materials are extremely sensitive to said waste resins and react therewith.

On these grounds, the raw materials of thermoplastic resins to be used as packaging materials for photographic materials must be limited to only those of high quality whose characteristics are definitely clarified and which are quite free from any harmful substances, in the present situation.

Accordingly, such special resins that the kind and the amount of the additives contained therein are specifically defined according to the photographic materials to be packaged and are to be used for said purpose, and therefore the packaging materials have heretofore been extremely expensive and high-priced.

On the other hand, commercial resin raw materials, especially imported resins and reclaimed resins, are low-priced, and therefore, if these may be utilized for packaging photographic materials, the utilization is industrially advantageous.

SUMMARY OF THE DISCLOSURE

The object of the present invention is to provide inexpensive and low-priced packaging materials for photographic materials, where any synthetic resins containing unknown additives as well as reclaimed resins may be used.

The present invention provides packaging materials (i.e., laminated sheets) comprising:

(a) a middle thermoplastic resin layer containing any harmful substances having a possibility of adversely affecting (or deteriorating) photographic materials, (b) a photographically inactive outer layer with a higher gas-permeability, and (c) an inner layer with a lower gas-permeability.

Thus, migration of transfer of the harmful substances to the inner surface of the sheet (the side in contact with the packaged photographic materials) may be prevented, and the packaging sheets may be used safely. The harmful substances contained in the middle layer (a) diffuse out through the outer layer (b) which has a higher gas-permeability, or they essentially do not migrate into the packaged photographic materials through the inner layer (c) during the effective term of photographic materials, whereby the influence of the harmful substances upon the photographic materials through the inner layer may be prevented.

Particularly according to the first aspect of the present invention there is provided a laminated material for packaging photographic materials, which comprises:

(a) a middle layer comprising a thermoplastic resin layer which contains any harmful substances having a possibility of adversely effecting photographic materials, (b) a photographically inactive outer layer having a higher gas-permeability comprising a thermoplastic resin layer and/or a flexible sheet layer with pores and/or bores, and (c) a photographically inactive inner layer having a lower gas-permeability than the outer layer (b) comprising a thermoplastic resin layer or a flexible sheet layer or a laminated layer comprising the resin layer and flexible sheet layer.

According to the second aspect of the present invention there is provided a formed article like a container, a case, or caps thereof for packaging photographic materials comprised of a laminated material comprising:

(a) a middle layer of a thermoplastic resin layer which contains any harmful substances having possibility of adversely affecting photographic materials, (b) a photographically inactive outer layer of a thermoplastic resin layer having a higher gas-permeability, and (c) a photographically inactive inner layer having a lower gas-permeability than said outer layer (b) comprising a thermoplastic resin layer, a deposited metal layer, a printed layer and/or coated layer.

The materials for preparing the formed articles should have forming capability in, e.g., press forming, extrusion-or injection molding, vacuum forming, or the like. Laminated sheets which can be press formed are most preferred for preparing formed articles.

DETAILED DESCRIPTION OF THE PREFERRED EMBODIMENTS

The inner layer of the present invention is one having sufficiently less gas-permeability than the outer layer. The inner layer comprises a thermoplastic resin layer and/or a flexible sheet such as a metal foil or a metal film formed by vapor deposition, or a complex-laminated layer thereof. Using a metal foil layer such as an aluminum foil, as the inner layer, is particularly preferred as being mostly safe in the view-point of prevention of migration of harmful substances, and this especially preferred as a packaging material for photographic materials, in view of light-shielding ability and antistatic ability. In this case, addition of a heat-seal layer to the inner most layer is preferable, so as to ensure the air-tightness of the package. A deposited aluminum layer is also effective, although not so complete as the aluminum foil. In comparison with such metal layers, the permeability of harmful substances through a thermoplastic resin layer is not zero.

In case a thermoplastic resin is used as the inner layer and even if a considerable amount of any harmful substances is incorporated in the middle layer, a safe package is possible so far as the packaging material comprises such constitution that the harmful substances may not migrate towards the packaged photographic products but migrate towards the outer layer. For this, the gas-permeability of the outer layer is to be made substantially sufficiently higher than that of the inner layer, for example, the former is made higher than the latter by 1.2 times or more, preferably 2 times or more.

Even though the inner layer itself cannot perfectly prevent the harmful substances contained in the middle layer from migrating towards the packaged photographic products, the object of the present invention may be achieved by differentiating the gas-permeability between the inner layer and the outer layer in such degree that any adverse influence upon the packaged photographic products does not substantially result from the migration of the harmful substances from the middle layer.

In the present invention, the term "photographically inactive . . . " means that the materials do not contain any photographically active substances such as antioxidants, polymerization initiators, dyestuffs, etc. Examples of said photographically active substances which adversely affect photographic materials are mercury, copper, mercury ion, copper ion, fluorescent brightening agents, active silicone oil, redox dyes, sulfur compounds, etc.

The flexible sheet layer constituting the outer layer comprises at least one selected from the group consisting of paper, bonded fabrics, cross laminated porous fabric, a perforated film or sheet, cloth yarns, and foamed and/or porous sheet. The flexible sheet layer constituting the inner layer is a metal foil, a thermoplastic resin film or a deposited metal film, or a laminated layer thereof.

BRIEF EXPLANATION OF DRAWINGS

The present invention will now be explained in more detail with reference to drawings attached hereto.

where (1) is an inner layer, (2a) is a middle layer (including carbon), (3) is an outer layer, (4) is an adhesive layer, (5) is a flexible sheet layer, (5') is a flexible sheet layer having bores, (6a) is a metal foil layer, (6'a) is a deposited metal film, (7) is a heat-seal layer, (8) is a hollowed part (air-permeable recess or bore), (9) is a foamed layer, (1×2) is a mixture layer of (1) and (2), (2×3) is a mixture layer of (2) and (3), and the suffix a means a light-shielding layer.

FIGS. 14-a and 14-b and FIGS. 15-a and 15-b show typical embodiments of packaging containers (cases) for photographic materials, where a three-layer laminated material of the present invention is used.

Figure 1:
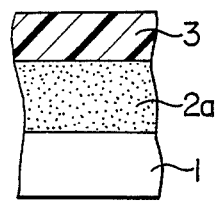
FIGS. 1 through 13 are sections to illustrate typical embodiments of laminated materials for packaging photographic materials of the present invention.

FIG. 1 is the simplest embodiment of the present invention, comprising the essential three layers only. It is necessary that the difference in gas-permeability between the inner layer (1) and the outer layer (3) is to be ensured by the variation in the thickness of said two layers and/or the components thereof. Typical combinations are 20 microns of high density polyethylene (inner layer) and 10 microns of linear low density polyethylene (L-LDPE) (outer layer); or 15 microns of polyvinylidene chloride (inner layer) and 15 microns of low density polyethylene (outer layer).

One concrete means of largely differentiating the gas-permeability between the inner layer and the outer layer is, in the first place, to use a synthetic resin with a higher gas-permeability as the outer-layer and a synthetic resin with a lower gas-permeability as the inner layer. The synthetic resins with a lower gas-permeability include those having $O_2$-permeability of 20 cc/100 $m^2$/mil/24 hr/mm/1 atm, 25° C. (measured by ASTM 1434) or less, such as polyester (6.0–8.0), polyamide (nylon) (2.6), polyvinylidene chloride (2.4), ethylene tri-fluoride (7–15), thermoplastic polyvinyl chloride (5–20), vinylon, etc.

The synthetic resins with a higher gas-permeability include those having said $O_2$-permeability of 300 cc/100 $m^2$/mil/24 hr/mm/1 atm, 25° C., or more, such as low density polyethylene (500), linear low density polyethylene (L-LDPE), ionomer (600), ethylene/vinyl acetate copolymer (EVA) (840), ethylene/ethyl acrylate copolymer, poly-carbonate (300), etc. These synthetic resins for the outer and inner layers may be single resins or complexes thereof. In addition, it is also effective to coat a specific resin of especially low gas-permeability, such as polyvinylidene chloride, on the inner layer.

The other means of differentiating the gas-permeability between the inner layer and the outer layer is to differentiate the thickness of the synthetic resins between said two layers. The thicker the synthetic resin layer is, the more difficult the gas-permeation is, and therefore, it is effective to make the thickness of the outer synthetic resin layer thin and that on the inner layer thick.

Our experiments revealed the fact that when the same resin is used, the inner layer is to be made thicker than the outer layer by 1.2 times or more, whereby the effect in accordance with the object of the present invention is sufficient. In practice, however, it is preferred that the former is thicker than the latter by 2–10 times.

Figure 2:
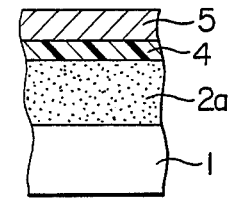

FIG. 2 shows another embodiment where a flexible sheet layer (5) is superposed on the outer layer of FIG. 1. It is preferred to use a gas-permeable paper or cellophane as the outer flexible sheet, whereby the substantial thickness of the outer layer (3) may be reduced and the difference of the gas-permeability between inner and outer layers may be increased, and thus, this is advantageous. The components of the inner and outer layer accord with those of FIG. 1.

Figure 3:
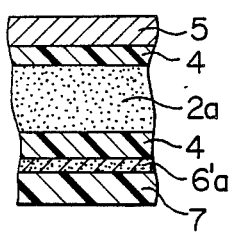

In FIG. 3, 5 microns of deposited aluminum layer (6'a) is interposed on the side directed to the inner layer. Due to this aluminum layer, the difference of the gas-permeability is made sufficiently large and the diffusion of the harmful substances through into the inner layer may sufficiently be prevented, and therefore it is almost unnecessary to restrict the thickness and the components of inner and outer layers. In addition, the outer flexible sheet (5) may be a layer of somewhat low gas-permeability. For example, 25 microns of cellophane paper with vinylidene chloride coating (5 microns) on the surface thereof may be used as the layer (5), and 20 microns of low density polyethylene as the heat-seal layer (7), without any inconvenience.

Figure 4:
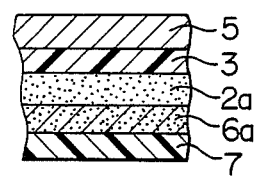

FIG. 4 shows a laminated sheet comprising a middle layer (2a), an outer layer of highly gas-permeable thermoplastic resin layer (3) and a flexible sheet layer (5), and an inner layer of a metal foil layer (6a), and is manufactured as follows: After directly sticking the middle layer (2a) and the outer layer (3) through two-layer simultaneous co-extrusion, the heat-seal layer (7) is laminated on the metal foil layer (6a) by melt-extrusion.

Figure 5:
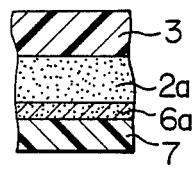

FIG. 5 shows a laminated sheet where an aluminum foil layer is laminated to the side of the inner layer. This is used when the most perfect prevention of gas-permeation throughinto the inner layer is required. Any consideration is unnecessary on the gas-permeability of the inner layer, and the innermost layer may comprise any optional components of good heat-seal property.

Figure 6:
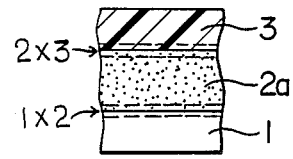

FIG. 6 comprises the same three layers as shown in FIG. 1, whereas a mixture layers (2×3, 1×2) are formed in each boundary surface where the two layers are in contact with each other. Such mixture layer may be formed by conventional co-extrusion means, and this is effective for prevention of interlaminar peeling.

Figure 7:
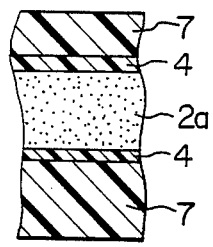

FIG. 7 shows one embodiment where the both surfaces require heat-seal property. The outer layer is low density polyethylene with a thickness of 10 microns and the inner layer is low density polyethylene with a thickness of 25 microns. Thus, the gas-permeability of said two layers is controlled by the difference of the thickness therebetween.

Figure 8:
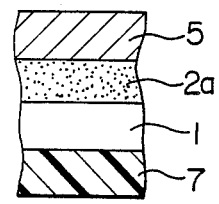

In FIG. 8, the outer layer is a flexible sheet of paper, and the inner layer (1) may freely be selected. For the inner layer (1), any perfect gas-impermeability is unnecessary, and the laminated sheets of this kind may be utilized in a wide industrial use in case the laminated sheets are necessarily to have heat-seal property and these are to be low-priced.

In addition, it is advantageous to make a lot of recesses or rugged depressions in the outer layer, and in this case, the gas-permeability of the material itself of the outer layer may be reinforced further. For example, in case a rugged pattern is formed on the surface of the outer layer by an embossing-roll or the like, the thickness of the outer layer is partially made thin in the recesses, and gas may escape therethrough. The rugged pattern may be arranged in the form of either dots or continuous grooves, and anyhow it is desired that the recesses are so finely and evenly dispersed as possible, on the surface of the outer layer.

Figure 9:
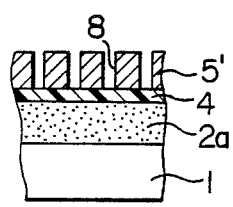
Figure 10:
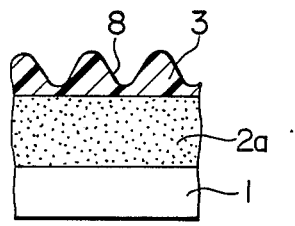

Referring to FIG. 9, the outer layer (5') is a bonded fabric having gas-permeating bores, and the bonded fabric is attached with an adhesive layer (4). In FIG. 10, the outer layer is directly laminated on the middle layer, where a shallow rugged pattern is embossed.

Figure 11:
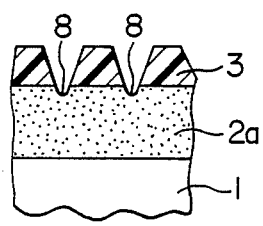
Figure 12:
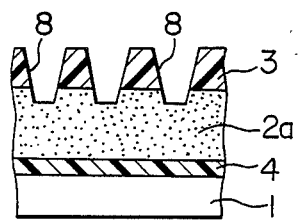

The deeper the recesses are, the better the effect of the present invention is. Accordingly, these recesses are not restricted only in the surface of the outer layer, but these may reach to the surface of the middle layer to form through bores (refer to FIG. 11, No. 8). Furthermore, these bores may encroach upon the middle layer, so far as other properties of laminated sheets, such as physical strength thereof are not deteriorated. (In the case of FIG. 12, No. 8, the gas-permeability of the outer layer material itself has almost no influence on the laminated sheet and may be disregarded.) The rugged patterns as shown in FIGS. 10, 11 and 12 are general, but the present invention includes any other rugged patterns. The more the amount (per unit area) and the size of the recesses are, the better the gas-permeability of the recessed outer layer is. Anyway, these are determined under the consideration of physical strength of laminated sheets and the use thereof.

It is also effective that the outer layer comprises a porous layer. For example, foamed sheets, cloth yarns, bonded fabrics, gas-permeable papers, bonded porous fabric, etc. may be used as the outer layer. The foamed sheets are preferably open-cellular sheets, but closed-cellular sheets may also be used.

Figure 13:
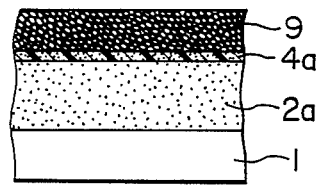

FIG. 13 shows one embodiment of this case where a porous flexible sheet is used as the outer layer, and a foamed polystyrene sheet or the like may be used in accordance with the use of the laminated sheets.

In addition to the above mentioned embodiments, the gas-permeability may be variously changed, depending upon the crystallinity and molecular orientation degree of synthetic resins and the addition of plasticizer, etc. thereto. Accordingly, it is preferred to use as the outer layer such synthetic resins that the crystallinity and the molecular orientation degree thereof are smaller, if possible, and that the amount of the added plasticizer is larger.

In the case of polyvinyl chloride, the gas-permeability largely varies, depending upon the amount of the added plasticizer. When a silicone is added to a thermoplastic resin in an amount of 0.1–2.0 wt. %, the gas-permeability of said resin is made extremely higher, and it is effective to use said silicone-containing resin as the outer layer.

In the present invention, various kinds of the above mentioned means for imparting a definite and sufficient gas-permeability to the outer layer may optionally and selectively be employed alone or in the combination of two or more means, in accordance with the object (or use) of the present invention. As a result, it is needless to say that the obtained laminated sheets may correspond with the characteristics of photographic products to be packaged therewith, and a sufficient gas-permeability may be imparted to the outer layer, in accordance with the quality of the synthetic resins such as waste materials to be used as the middle layer.

The packaging materials of the present invention must have a light-shielding ability, as being used especially for packaging photographic materials. Accordingly, it is necessary that one or more layers of the laminated sheets of the present invention contain a light-shielding substance. The light-shielding substances may be any of general pigments and dyestuffs, as well as an aluminum foil layer and deposited aluminum film and powdery light-shielding substances having an antistatic ability, such as various kinds of carbon black, metal powders or the like.

Known and conventional light-shielding substances may be used, and various kinds of carbon black may be used most widely, as these are low-priced and have a high light-shielding effect. In case the middle layer is colored, it is preferred that said substance is added to the middle layer, whereby the moisture absorption may be prevented and the color may be concealed. Incorporation of 0.1 g/m² or more of the light-shielding substance in the total of the laminated sheet may ensure at least the necessary and indispensable light-shielding property thereof, and in general, the amount is preferably 1.2–7 g/m². The uppermost limit thereof is about 30 g/m², so far as the strength, etc. of the sheet are not deteriorated. It is preferred to include the light-shielding substance at least in the inner layer (or innermost layer).

In case that an adhesive agent or an adhesive layer is used in the lamination, the light-shielding substance may be incorporated in said adhesive agent or adhesive layer.

The flexible sheet layers may be used in both the outer and the inner layers, in accordance with the materials thereof. Examples of sheets with pores and/or bores which may be used as the outer layer are paper, bonded fabrics, bonded porous fabric, perforated films, cloth-yarns, foamed sheets, porous sheets, micro-porous sheets, etc. In addition, various kinds of non-porous films (such as cellophane, various kinds of thermoplastic films, cellulose-triacetate film, etc.) may also be used, so far as the thickness of said film is so controlled that the gas-permeability of the outer layer is larger than that of the inner layer by 1.2 times or more.

Examples of the inner layer are metal foil layers such as aluminum foil, tin foil, and iron foil; metal films formed by vapor deposition techniques such as aluminum or chromium film; thermoplastic resin films such as nylon, polyester, various kinds of, polyethylene, polypropylene, teflon, polyvinyl alcohol, acrylo-nitrile, polyvinylidene chloride and vinyl chloride; modified films such as vinylidene chloride-coated cellophane or polypropylene; and complex-laminated sheets comprising the above mentioned films, metal foils and/or metal-plated films.

Flexible sheets which are similar to the outer layer may also be used as the inner layer, so far as the thickness and the material of the sheets are taken into consideration so that the gas-permeability of the inner layer is made smaller to the degree of 5/6 of the outer layer.

The laminated sheets of the present invention comprise the above mentioned indispensable three layers of inner, middle and outer layers, and any other layers may also be added thereto, in order to satisfy general characteristics required in packaging materials. For example, formation of a heat-seal layer on the surface of the inner layer and formation of a flexible sheet layer such as cellophane paper on the surface of the outer layer are advantageous. In particular, the latter is preferable not only for the purpose of preventing the packaged photographic materials from being adversely affected but also in view of the printing ability and appearance of the outer layer. When other layers are added to the surface of the outer layer, however, careful attention should be paid thereto so that the additional layers do not disturb the gas-permeability of the outer layer.

In the practice of the present invention, formation of a mixture layer of the contacting two layers in the boundary surface thereof, by co-extrusion or the like, is possible, whereby the adhesiveness of the two layers may be improved. For example, in case a waste material containing a large amount of a polyethylene resin is used as the middle layer, it is preferred to use a polyethylene resin which does not adversely affect photographic materials as the inner layer, rather than to use nylon as the inner layer, because the adhesiveness of the two layers is extremely improved in the former case.

The subject matter of the present invention comprises at least packaging laminated material of the sheet form, but this invention is not restricted only to sheets. It is needless to say that various kinds of shaped articles or products such as containers are included within the scope of the present invention. That is, the present laminated material may be utilized in the form of containers or the like, as shown in FIGS. 14 and 15.

FIG. 14-a is a perspective view of a case for photographic materials of the sheet type made of the inventive shaped laminated material; and FIG. 14-b is an A-A-B-B section thereof. Referring to FIG. 14-a, the case comprises a main portion (9) and caps (10) and (10'). The main portion (9) comprises the layer constitution as shown in FIG. 14-b, and plural photographic sheets are kept in the hollow space (11).

FIG. 15-a is a perspective view of a 35 mm (J135) film-cartridge case for amateurs, made of a shaped laminated material of the present invention; and FIG. 15-b is a central section of the body thereof. Referring to FIG. 15-a, the body (12) of the cartridge case is made of the shaped laminated material of the present invention, and the cap (13) may be a conventional one. In FIG. 15-b, a film cartridge is kept in the hollow space (14).

As explained above in detail, various shapes of containers for photographic materials may be manufactured according to the means of the present invention, for example, in case containers of thick synthetic resin body are manufactured or in case reclaimed resins, etc. are utilized in a resin layer which does not directly affect the necessary properties of photographic products to be packaged.

The present invention will now be explained in more detail in the following examples, and the excellent merits of the present invention will be self-explanatory therefrom.

EXAMPLE 1

Reference is made to FIG. 1. The middle layer (2a) is a scrap-polyethylene layer having a thickness of 60 microns, and this contains 0.7 wt. % of an antistatic agent (Leostat 53 BY Lion Fat & Oils Co., Ltd.) which will impart a bad influence to photographic materials and 3.0 wt. % of carbon black. The outer layer (3) is a low density polyethylene having a thickness of 15 microns; and the inner layer (1) is a low density polyethylene having a thickness of 30 microns. The laminated sheet was manufactured by three-layer co-extrusion of inflation method. The co-extrusion was carried out under the condition as shown in the following Table 1.

TABLE 1

|  | Used resin | Thickness of resin | Temperature of resin | Filming-extrusion speed | Folded width of extruded film | Blow ratio | Screw L/D |
|---|---|---|---|---|---|---|---|
| Outer layer | Virgin low density polyethylene | 15 μm | 175° C. | 5 m/min. | 30 cm | 1.2 | 24 |
| Middle layer | Scrap-polyethylene | 60 μm | 180° C. | | | | |
| Inner layer | Virgin low density | 30 μm | 175° C. | | | | |

TABLE 1-continued

| Used resin | Thickness of resin | Temperature of resin | Filming-extrusion speed | Folded width of extruded film | Blow ratio | Screw L/D |
|---|---|---|---|---|---|---|
| polyethylene | | | | | | |

The inner layer of the obtained laminated sheet was kept in direct contact with a non-developed photographic paper for 6 months in a dark place, and afterwards, any undesirable phenomenon was not observed. In comparison, another laminated sheet was manufactured, comprising the same layer constitution as above with the exception that the middle layer is made of a standard polyethylene (Comparative Example 1). These two sheets were analogously tested for a longer period and any apparent difference between the two was not observed. The results are shown in the following Table 2.

EXAMPLE 2

Reference is made to FIG. 4. The middle layer (2a) is the same scrap-polyethylene as in the Example 1. This was laminated together with the low density polyethylene layer (3) having a thickness of 15 microns by co-extrusion lamination method under the condition as shown in the following Table 2, whereby the inner layer of aluminum foil (6a) having a thickness of 7 microns and another outer layer of 30 g/m² of paper (flexible sheet) were laminated. Afterwards, the heat-seal layer (7) of low density polyethylene having a thickness of 20 microns was laminated on the aluminum foil layer (6a) by melt-extrusion lamination process.

TABLE 2

| | Used resin | Thickness of resin | Temperature of resin | Extrusion speed | width of laminate | L/D | Cooling temperature |
|---|---|---|---|---|---|---|---|
| Outer layer | Paper | 35 μm | (sticking) | 100 m/min. | 100 mm | — | 20° C. |
| Outer layer | Virgin low density polyethylene | 15 μm | 305° C. | | | 28 | |
| Middle layer | Scrap-polyethylene | 60 μm | 310° C. | | | | |
| Inner layer | Aluminum foil | 7 μm | (sticking) | | | — | |
| Heat-seal layer | Virgin low density polyethylene | 20 μm | 310° C. (post-lamination) | | | 28 | |

In comparison, another laminated sheet was manufactured analogously to the manner of the Example 2, provided that the inner layer was a scrap-polyethylene layer having a thickness of 70 microns, the middle layer was an aluminum foil and the outer layer was a low density polyethylene layer (Comparative Example 2). These laminated sheets were tested analogously to the Example 1. The laminated sheet of the Comparative Example 2 rapidly deteriorated the packaged photographic papers, and this could not be used at all as a packaging sheet since the appearance, the color and the smoothness of the inner layer surface were unacceptable and the surface contained lugs. On the contrary, any abnormal phenomena or inconvenient matters were not observed in the laminated sheet of the present Example 2. The comparative results are shown in the following Table 3.

TABLE 3

| | Comparative Example 1 | Present Example 1 | Comparative Example 2 | Present Example 2 |
|---|---|---|---|---|
| layer constitution | low density polyethylene 15 μm | low density polyethylene 15 μm | paper 30 g/m² | paper 30 g/m² |
| | LDPE 60 μm (including carbon) | Scrap-LDPE 60 μm | LDPE 15 μm | LDPE 15 μm |
| Outer layer ↓ ↓ ↓ ↓ ↓ Inner layer | low density polyethylene 30 μm | low density polyethylene 30 μm | aluminum foil 7 μm | scrap-LDPE 70 μm (including carbon, waste material) |
| | (three-layer co-extrusion) | (three-layer co-extrusion) | LDPE 15 μm | aluminum foil 7 μm |
| | | | scrap-LDPE 70 μm (including carbon) | adhesive layer (two-layer co-extrusion lamination) |
| Cost index | 100 | 45 | 70 | 65 |
| Photographic properties | good | good | impossible to use | excellent |
| Others, appearance, aptitude for packaging | good | good | no good | excellent |

*Including inconvenient problems with respect to surface property, occurence of lugs, surface smoothness and color.

As apparent from the results of the above Table 3, the packaging sheets of the presnt invention are excellent in every respect of cost, photographic properties, appearance, etc.

What is claimed is:

1. A formed container having light shielding ability for packaging photographic materials, said container having an inner surface fully enclosing the photographic material and being comprised of a laminated material comprising:
   (a) a middle layer of a thermoplastic resin layer which contains any harmful substances adversely affecting photographic materials,
   (b) a photographically inactive outer layer of a thermoplastic resin layer having gas-permeability, and
   (c) a photographically inactive inner layer which is at least coextensive with the middle layer for closer proximity to the photographic material than the middle and outer layers and having a lower gas-permeability than said outer layer (b) wherein the gas permeability of the outer layer is at least 1.2 times greater than the gas permeability of the inner layer, wherein at least one of the middle, outer and inner layers contains a light shielding substance.

2. The formed container as defined in claim 1, wherein said inner and outer layers are made of the same or similar materials and the thickness of the inner layer is more than that of the outer layer, whereby the gas-permeability of the latter is made greater than the former.

3. The formed container as defined in claim 2, wherein the inner layer is thicker than the outer layer by 1.2 times or more.

4. The formed container as defined in Claim 2, wherein the outer and inner layers comprise LDPE.

5. The formed container as defined in claim 1, wherein the laminated material is a laminated sheet.

6. The formed container as defined in claim 5, wherein at least two adjacent layers of the inner, middle and outer layers of the laminated sheet are formed by co-extrusion.

7. The formed container as defined in claim 6, wherein a mixture layer is formed in the interfacial boundary of two adjacent layers formed by co-extrusion, said mixture layer being comprised of the materials of the adjacent two layers.

8. The formed container as defined in claim 1, wherein the middle layer includes the light-shielding substance.

9. The formed container as defined in claim 1, wherein the amount of the light-shielding substance incorporated therein is 0.1–30 $g/m^2$.

10. The formed container as defined in claim 1, wherein the thermoplastic resin layer is comprised of one or more selected from the group consisting of polystyrene, polycarbonate, LDPE, L-LDPE, ionomer resin, ethylene/vinyl acetate copolymer (EVA) and ethylene/ethyl acrylate copolymer.

11. The formed container as defined in claim 1, wherein the inner layer is comprised of one or more selected from the group consisting of saponified polyvinyl alcohol, polyvinylidene chloride, polyvinyl alcohol, HDPE, LDPE, polypropylene, polyamide, polyvinyl chloride, polyester, L-LDPE and ionomer resin.

12. The formed container as defined in claim 1, wherein a deposited metal film layer, a printed layer or a composite layer thereof is formed as the inner layer on the inner side of the middle layer facing towards the articles to be packaged.

13. The formed container as defined in claim 1, wherein the maximum $O_2$-permeability of the inner layer is 20 cc/100 $m^2$/mil/24 hr/mm/1atm, 25° C. measured by ASTM 1434.

14. The formed as defined in claim 1, wherein the photographically inactive inner layer comprises a thermoplastic resin layer.

15. The formed container as defined in claim 1, wherein the photographically inactive inner layer comprises a deposited metal layer.

16. The formed container as defined in claim 1, wherein the photographically inactive inner layer comprises a printed layer.

17. The formed container as defined in claim 1, wherein the photographically inactive inner layer comprises a coated layer.

* * * * *